US009135440B2

(12) United States Patent
Prowell et al.

(10) Patent No.: US 9,135,440 B2
(45) Date of Patent: Sep. 15, 2015

(54) STATISTICAL FINGERPRINTING FOR MALWARE DETECTION AND CLASSIFICATION

(71) Applicant: UT-Battelle, LLC, Oak Ridge, TN (US)

(72) Inventors: Stacy J. Prowell, Oak Ridge, TN (US); Christopher T. Rathgeb, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 23 days.

(21) Appl. No.: 13/955,784

(22) Filed: Jul. 31, 2013

(65) Prior Publication Data

US 2014/0041031 A1 Feb. 6, 2014

Related U.S. Application Data

(60) Provisional application No. 61/678,266, filed on Aug. 1, 2012.

(51) Int. Cl.
*G06F 21/56* (2013.01)
(52) U.S. Cl.
CPC .............. *G06F 21/56* (2013.01); *G06F 21/566* (2013.01)
(58) Field of Classification Search
CPC ................................ G06F 21/56; G06F 21/566
See application file for complete search history.

(56) References Cited

U.S. PATENT DOCUMENTS

| 5,485,575 A * | 1/1996 | Chess et al. ................. 714/38.13 |
| 7,730,530 B2 * | 6/2010 | Bodorin et al. ................. 726/22 |
| 8,407,793 B2 * | 3/2013 | Demblewski ................... 726/24 |
| 2003/0088680 A1 * | 5/2003 | Nachenberg et al. ......... 709/229 |
| 2003/0212906 A1 * | 11/2003 | Arnold et al. ................. 713/201 |
| 2004/0205411 A1 * | 10/2004 | Hong et al. ...................... 714/38 |
| 2005/0240769 A1 * | 10/2005 | Gassoway ...................... 713/176 |
| 2009/0183261 A1 * | 7/2009 | Peinado et al. ................. 726/24 |
| 2011/0295727 A1 * | 12/2011 | Ferris et al. ...................... 705/34 |
| 2013/0160121 A1 * | 6/2013 | Yazdani .......................... 726/23 |
| 2014/0215621 A1 * | 7/2014 | Xaypanya et al. .............. 726/23 |

OTHER PUBLICATIONS

Jacob et al., "Behavioral detection of malware: from a survey towards an established taxonomy", 2008.*
Gaurav et al., "Countering Code-Injection Attacks With Instruction-Set Randomization", CCS'03, Oct. 27-31, 2003.*
Rathgeb, Christopher Thomas, "Dynamic Application Level Security Sensors," Master's Thesis, University of Tennessee, May 2010, 121 pages.

* cited by examiner

*Primary Examiner* — Mohammad L Rahman
(74) *Attorney, Agent, or Firm* — Brinks Gilson & Lione

(57) ABSTRACT

A system detects malware in a computing architecture with an unknown pedigree. The system includes a first computing device having a known pedigree and operating free of malware. The first computing device executes a series of instrumented functions that, when executed, provide a statistical baseline that is representative of the time it takes the software application to run on a computing device having a known pedigree. A second computing device executes a second series of instrumented functions that, when executed, provides an actual time that is representative of the time the known software application runs on the second computing device. The system detects malware when there is a difference in execution times between the first and the second computing devices.

9 Claims, 2 Drawing Sheets

STATISTICAL FINGERPRINTING FOR MALWARE DETECTION AND CLASSIFICATION

CROSS REFERENCE TO RELATED APPLICATION

This application claims priority to U.S. Provisional Patent Application No. 61/678,266, filed Aug. 1, 2012, and which is incorporated herein by reference in its entirety

STATEMENT REGARDING FEDERALLY SPONSORED RESEARCH AND DEVELOPMENT

The inventions were made with United States government support under Contract No. DE-AC05-000R22725 awarded by the United States Department of Energy. The United States government has certain rights in the inventions.

BACKGROUND

1. Technical Field

This disclosure relates to software security and more specifically to a system and method that identifies malware.

2. Related Art

Some technologies detect malware infections by detecting the presence of byte sequences that are common to malware (e.g., malware signatures). Dynamic analysis such as "sandboxing" may be performed, but such analysis may be limited and may depend on trigger conditions.

DETAILED DESCRIPTION OF THE PREFERRED EMBODIMENTS

Figure 1:
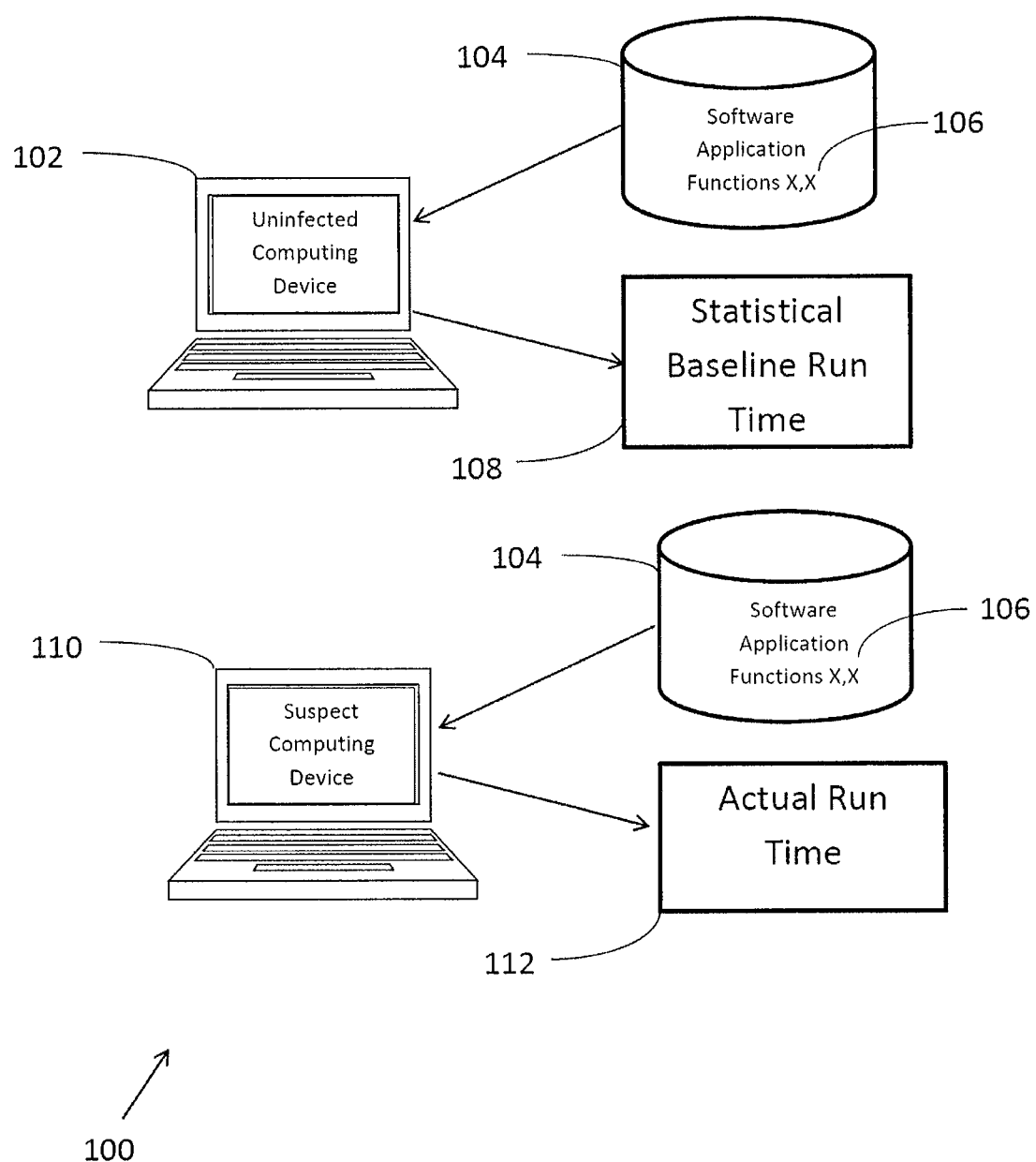
FIG. 1 illustrates a system for identifying malware infections.

A computer or processor performs high-speed mathematical and logical operations and assembles, stores, and processes information. Some specially programmed computers execute instructions that are stored on a machine-readable data storage device or in a non-transitory media.

The machine-readable data storage device may include a portable memory device that is accessible to one or more processors or computers. The portable memory device may include a compact disk (CD), digital video disk (DVD), a Flash Drive, or other disk readable media coupled to a computer or processor via a cloud storage or a tangible interface. Alternately, the machine-readable data storage device may be embedded within a local or distributed controller or computer accessible media that includes a hard disk or a flash drive. The computer and machine-readable data storage device may comprise a standalone device or a device that is embedded within a dedicated machine or system that executes instructions.

A system that detects malware in computer architectures includes a first computing device 102 having a known pedigree, operating profile or performance profile that is free of malware. The first computing device 102 operates a programmed software application 104 that comprises a series of instrumented functions 106 that, when executed on the first computing device 102, provide a statistical baseline run time 108 that represents the time in which the software application runs on the computing device 102, which has a known pedigree and operates free of malware. Malware may comprise software that is intended to damage or disable a computer, interfaces and/or computer accessories. The statistical baseline run time 108 may be based on a single execution or alternatively on several program executions.

A second computing device 110, having an unknown pedigree, may include software that operates in a malicious or undesirable manner. The second computing device 110 may operate a known software application 104 that comprises a series of instrumented functions 106 that, when executed, provides an actual run time 112 that is representative of the time the preprogrammed (or known) software application 104 runs on the second computing device 110. An automatic detection of the difference in run times between the statistical baseline time 108 and the actual time 112 identifies an infected machine, which may be isolated, flagged, and automatically initiate a safe mode which may shut down all non-essential software and/or hardware. Statistically equal or substantially equal run times 108, 112 may indicate malware was not detected. A greater actual run time 112 by the second computing device 110 may indicates a positive malware status. A non-report of actual run time 112 or a significantly low run time may also indicate a malware detection.

Figure 2:
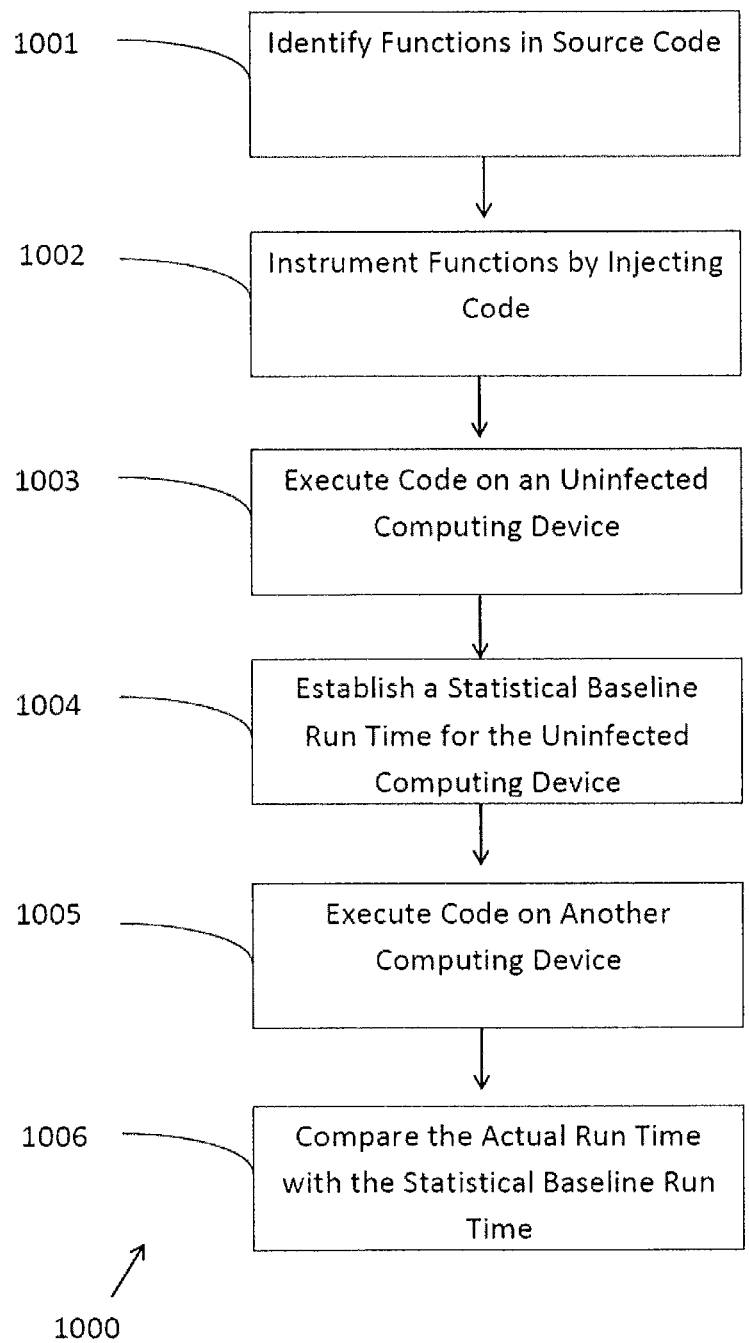
FIG. 2 illustrates a method for identifying malware infections.

FIG. 2 illustrates a method for identifying malware infections. In FIG. 2 a collection of functions in the operating system or various software applications is identified at 1001, and each is then instrumented via injecting code (DLL or shared object library injection) that measures the execution time of the function at 1002. The code injection may introduce code into a program that when invoked changes the course of execution of a program and/or implements specialized features such as monitoring the run time of the software application.

The software application may be executed on many computing platforms. In FIG. 2 it is injected into a device with a known operating or performance profile that is malware free at 1003. The execution time tracked by the code injection is monitored and stored in memory to establish a statistical baseline for an uninfected machine at 1004. A statistical baseline run time may be stored locally in a database, in a distributed memory, in a cloud storage or in a remote memory accessible through a tangible or intangible medium (e.g., a wireless medium). In some system, alternative data may be processed and other run times monitored to evaluate statistical operating performance of the systems under different processing loads.

The software at 1001 and 1002 may be executed by a system with an unknown pedigree or unknown performance or operating profile at 1005. If infected, the system's performance may be affected which may generate a statistical temporal deviation from the baseline run time that may be detected (a "symptom" of the infection) at 1006. Some infections may be detected through a failure to report collected results; or reporting of data that deviates from a predetermined baseline, for example. When detected, the infected hardware and/or software may be automatically quarantined, the infected software deleted and in some systems replaced automatically (e.g., the system may revert to a state immediately before the infection or to another restore point) or other processes may be executed automatically.

The systems, methods and descriptions described may be programmed in one or more computers, servers or may be encoded in a non-transitory signal bearing medium, a computer readable medium such as a memory that may comprise unitary or separate logic, programmed within a device such as one or more integrated circuits, retained in memory and/or processed by a controller or a computer. If the methods are performed through software, the software or logic may reside in a memory resident to or interfaced to one or more processors or controllers that may support a tangible communication interface, wireless communication interface, or a wireless system. The memory may include an ordered listing of executable instructions for implementing logical functions. A logical function may be implemented through digital circuitry, through source code, or through analog circuitry. The software may be embodied in a non-transitory computer-readable medium, for use by, or in connection with an instruction executable system, apparatus, and device. Such a system may include a computer-based system, a processor-containing system, or another system that includes an input and output interface that may communicate with a publicly accessible distributed network through a wireless or tangible communication bus through a public and/or proprietary protocol and may respond to commands, events, actions, and/or requests.

A "computer-readable medium," "machine-readable medium," "propagated-signal" medium, and/or "signal-bearing medium" may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Parameters, databases, comparison software, pre-generated models and data structures used to evaluate and analyze computers and systems may be separately stored and managed, may be incorporated into a single memory block or database, may be logically and/or physically organized in many different ways, and may be implemented in many ways, including data structures such as linked lists, hash tables, or implicit storage mechanisms. Programs may be parts (e.g., subroutines) of a single program, separate programs, application program or programs distributed across several memories and processor cores and/or processing nodes, or implemented in many different ways, such as in a library or a shared library accessed through a client server architecture across a private network or public network like the Internet.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a statistically significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system that determines if malware exists in a computing architecture with an unknown pedigree comprising:
    a first computing device having a known pedigree and operating free of malware, the first computing device operating a known software application that comprises a series of instrumented functions that, when executed, provide a statistical baseline time that is representative of the time it takes the software application to run on a computing device having a known pedigree and operating free of malware; and
    a second computing device having an unknown pedigree and with the potential of operating with malware, the second computing device operating the known software application that further comprises a series of instrumented functions that, when executed, provides an actual time that is representative of the time the known software application runs on the second computing device having an unknown pedigree and operating with the potential of operating with malware;
    where the instrumented functions are injected into the known software application through a code injection that facilitates accessing a plurality of subroutines that is shared by a plurality of software applications; and
    where the difference in times between the statistical baseline time and the actual time identifies a malware status of the second machine.

2. The system of claim 1 where the identification comprises an automatic detection.

3. The system of claim 2 where the executed functions are injected into the known software application.

4. The system of claim 3 where the injection changes the sequence of execution of the known software.

5. The system of claim 4 where the injection comprises introducing software code into the known software application when the known software application is invoked.

6. The system of claim 5 where statistical baseline time is based on a plurality of executions of the known software application.

7. The system of claim 6 where the statistical baseline time is stored in a cloud storage system.

8. A method for determining if malware exists in a computing device with unknown pedigree and with the potential of operating with malware comprising:
    a. identifying one or more functions in a software application;
    b. instrumenting the functions by injecting code into the software application to that measures the execution time of the functions;
    c. executing the software application on a first computing device with a known pedigree and that is known to be free of malware;
    d. establishing a statistical baseline time that the software application takes to execute on a computing device with a known pedigree and that is known to be free of malware;

e. executing the software application on a second computing device that does not have a known pedigree and with the potential of having malware;
f. measuring the actual time that the software application takes to execute; and
g. comparing the actual time of execution with the statistical baseline time of execution where the injecting code facilitates accessing a plurality of subroutines that is shared by a plurality of software applications.

9. The method of claim 8 where the acts of measuring and comparing are executed by a processor remote from the execution of the software.

\* \* \* \* \*

UNITED STATES PATENT AND TRADEMARK OFFICE
CERTIFICATE OF CORRECTION

| | | |
|---|---|---|
| PATENT NO. | : 9,135,440 B2 | |
| APPLICATION NO. | : 13/955784 | |
| DATED | : September 15, 2015 | |
| INVENTOR(S) | : Stacy J. Prowell et al. | |

It is certified that error appears in the above-identified patent and that said Letters Patent is hereby corrected as shown below:

In the Claims

In column 4, line 59, claim 8, after "software application to" replace "that measures" with --measure--.

Signed and Sealed this
Ninth Day of February, 2016

Michelle K. Lee
*Director of the United States Patent and Trademark Office*